United States Patent
Kuffner et al.

(10) Patent No.: US 10,210,618 B1
(45) Date of Patent: Feb. 19, 2019

(54) OBJECT IMAGE MASKING USING DEPTH CAMERAS OR THREE-DIMENSIONAL (3D) MODELS

(71) Applicant: Google Inc., Mountain View, CA (US)

(72) Inventors: James Joseph Kuffner, Sunnyvale, CA (US); James Robert Bruce, Sunnyvale, CA (US); Ken Conley, Mountain View, CA (US); Arshan Poursohi, Berkeley, CA (US)

(73) Assignee: Google LLC, Mountain View, CA (US)

( * ) Notice: Subject to any disclaimer, the term of this patent is extended or adjusted under 35 U.S.C. 154(b) by 707 days.

(21) Appl. No.: 14/579,555

(22) Filed: Dec. 22, 2014

Related U.S. Application Data (60) Provisional application No. 61/921,108, filed on Dec. 27, 2013.

(51) Int. Cl.
    *G06T 7/194* (2017.01)
    *G06T 15/60* (2006.01)
    *G06T 17/00* (2006.01)

(52) U.S. Cl.
    CPC .............. *G06T 7/194* (2017.01); *G06T 15/60* (2013.01); *G06T 17/00* (2013.01); *G06T 2215/12* (2013.01); *G06T 2215/16* (2013.01)

(58) Field of Classification Search
    None
    See application file for complete search history.

(56) References Cited

U.S. PATENT DOCUMENTS

| | | | |
|---|---|---|---|
| 2013/0011046 A1* | 1/2013 | Choi ................... | G06T 7/0051 382/154 |
| 2013/0243313 A1* | 9/2013 | Civit ................... | G06T 5/002 382/164 |

OTHER PUBLICATIONS

Gvili, Ronen, et al. "Depth keying." Electronic Imaging 2003. International Society for Optics and Photonics, 2003.*
Crabb, Ryan, et al. "Real-time foreground segmentation via range and color imaging." Computer Vision and Pattern Recognition Workshops, 2008. CVPRW'08. IEEE Computer Society Conference on. IEEE, 2008.*
Lu, Boun Vinh, et al. "Foreground and shadow occlusion handling for outdoor augmented reality." Mixed and Augmented Reality (ISMAR), 2010 9th IEEE International Symposium on. IEEE, 2010.*
Mian, Ajmal S., Mohammed Bennamoun, and Robyn Owens. "Three-dimensional model-based object recognition and segmentation in cluttered scenes." IEEE transactions on pattern analysis and machine intelligence 28.10 (2006): 1584-1601.*
(Continued)

*Primary Examiner* — Zhengxi Liu
(74) *Attorney, Agent, or Firm* — McDonnell Boehnen Hulbert & Berghoff LLP (57) ABSTRACT

Within examples, object image masking is provided. An example method includes receiving a depth mask of an object, projecting the depth mask of the object onto an image of the object in a background so as to generate a depth image of the object in the background, determining portions of the depth image of the object in the background that are representative of the object and that are representative of the background, based on the portions of the depth image of the object in the background that are representative of the object determining a foreground mask of the object, and using the foreground mask of the object to identify portions of the image representative of the object.

17 Claims, 8 Drawing Sheets

(56) References Cited

OTHER PUBLICATIONS

Gühring, Jens, "Dense 3D surface acquisition by structured light using off-the-shelf components." Photonics West 2001—Electronic Imaging. International Society for Optics and Photonics, 2000.
Scharstein, et al., "High-accuracy stereo depth maps using structured light." Computer Vision and Pattern Recognition (CVPR), 2003, pp. 195-202.
Salvi, et al., "Pattern codification strategies in structured light systems." Pattern Recognition 37.4 (2004).
Grossberg, et al., "What is the space of camera response functions?." Computer Vision and Pattern Recognition (CVPR), 2003. http://www.cs.columbia.edu/CAVE/software/softlib/dorf.php.
Garland, et al., "Surface simplification using quadric error metrics." Proceedings of the 24th annual conference on Computer graphics and interactive techniques, 1997.
HDI Advance, http://www.3d3solutions.com/products/3d-scanner/hdi-advance/, retrieved on Jan. 12, 2015.

\* cited by examiner

INPUT IMAGE

FIG. 5A

OBJECT MASK

TRIMAP OBTAINED BY BLURRING THE OBJECT MASK
FIG. 5D

OBJECT IMAGE MASKING USING DEPTH CAMERAS OR THREE-DIMENSIONAL (3D) MODELS

CROSS-REFERENCE TO RELATED APPLICATION

The present application claims priority to U.S. patent application Ser. No. 61/921,108, filed on Dec. 27, 2013, the entire contents of which are incorporated herein by reference.

BACKGROUND

In computer graphics, three-dimensional (3D) modeling involves generation of a representation of 3D features of an object. The representation may be referred to as a 3D object data model, and can be rendered or displayed as a two-dimensional image via 3D rendering or displayed as a 3D image. 3D object data models represent a 3D object using a collection of points in 3D space, connected by various geometric entities such as triangles, lines, curved surfaces, etc. Various techniques exist for generating 3D object data models utilizing point clouds and geometric shapes, for examples.

Being a collection of data, 3D models can be created by hand, algorithmically, or objects can be scanned, for example. As an example, an artist may manually generate a 3D image of an object that can be used as the 3D model. As another example, a given object may be scanned from a number of different angles, and the scanned images can be combined to generate the 3D image of the object. As still another example, an image of an object may be used to generate a point cloud that can be algorithmically processed to generate the 3D image.

3D object data models may include solid models that define a volume of the object, or may include shell or boundary models that represent a surface (e.g. the boundary) of the object. Because an appearance of an object depends largely on an exterior of the object, boundary representations are common in computer graphics.

3D models are used in a wide variety of fields, and may be displayed using a number of different types of interfaces. Example interfaces may provide functionality to enable interaction between a user and the 3D models.

SUMMARY

In one aspect, a method is provided comprising receiving a depth mask of an object, and the depth mask indicates three-dimensional (3D) aspects of the object. The method also comprises projecting, by a computing device, the depth mask of the object onto an image of the object in a background so as to generate a depth image of the object in the background, and determining portions of the depth image of the object in the background that are representative of the object and that are representative of the background. The method further comprises based on the portions of the depth image of the object in the background that are representative of the object, determining a foreground mask of the object, and using the foreground mask of the object to identify portions of the image representative of the object.

In another aspect, a non-transitory computer readable medium having stored therein instructions, that when executed by a computing device, cause the computing device to perform functions. The functions comprise receiving a depth mask of an object, and the depth mask indicates three-dimensional (3D) aspects of the object. The functions further comprise projecting the depth mask of the object onto an image of the object in a background so as to generate a depth image of the object in the background, determining portions of the depth image of the object in the background that are representative of the object and that are representative of the background, and based on the portions of the depth image of the object in the background that are representative of the object, determining a foreground mask of the object. The functions also comprise using the foreground mask of the object to identify portions of the image representative of the object.

In still another aspect, a system is provided that comprises one or more processors, and data storage having stored therein instructions, that when executed by the one or more processors, cause the system to perform functions. The functions comprise receiving a depth mask of an object, and the depth mask indicates three-dimensional (3D) aspects of the object. The functions also comprise projecting the depth mask of the object onto an image of the object in a background so as to generate a depth image of the object in the background, determining portions of the depth image of the object in the background that are representative of the object and that are representative of the background, and based on the portions of the depth image of the object in the background that are representative of the object, determining a foreground mask of the object. The functions also comprise using the foreground mask of the object to identify portions of the image representative of the object In another aspect, a system is provided that comprises a means for receiving a depth mask of an object, and the depth mask indicates three-dimensional (3D) aspects of the object. The system also comprises a means for projecting the depth mask of the object onto an image of the object in a background so as to generate a depth image of the object in the background, a means for determining portions of the depth image of the object in the background that are representative of the object and that are representative of the background, and based on the portions of the depth image of the object in the background that are representative of the object, a means for determining a foreground mask of the object. The system further comprises a means for using the foreground mask of the object to identify portions of the image representative of the object.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Within examples, object image masking is provided. An example method includes receiving a depth mask of an object, projecting the depth mask of the object onto an image of the object in a background so as to generate a depth image of the object in the background, determining portions of the depth image of the object in the background that are representative of the object and that are representative of the background, based on the portions of the depth image of the object in the background that are representative of the object determining a foreground mask of the object, and using the foreground mask of the object to identify portions of the image representative of the object.

Figure 1:
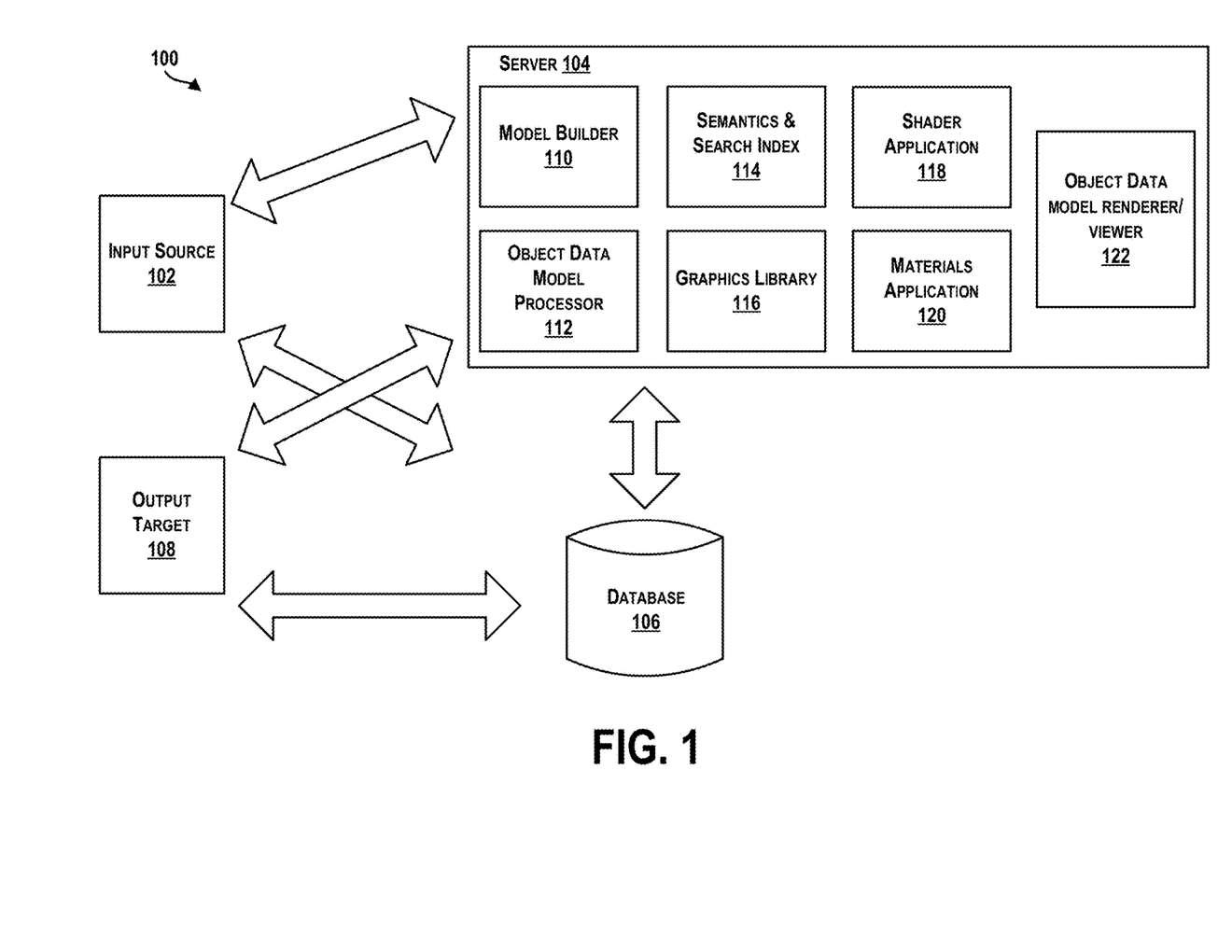
FIG. 1 illustrates an example system for object data modeling, in accordance with one example.

Referring now to the figures, FIG. 1 illustrates an example system 100 for object data modeling, in accordance with one example. The system 100 includes an input source 102 coupled to a server 104 and a database 106. The server 104 is also shown coupled to the database 106 and an output target 108. The system 100 may include more or fewer components, and each of the input source 102, the server 104, the database 106, and the output target 108 may comprise multiple elements as well, or each of the input source 102, the server 104, the database 106, and the output target 108 may be interconnected as well. Thus, one or more of the described functions of the system 100 may be divided up into additional functional or physical components, or combined into fewer functional or physical components. In some further examples, additional functional and/or physical components may be added to the examples illustrated by FIG. 1.

Components of the system 100 may be coupled to or configured to be capable of communicating via a network (not shown), such as a local area network (LAN), wide area network (WAN), wireless network (Wi-Fi), or Internet, for example. In addition, any of the components of the system 100 may be coupled to each other using wired or wireless communications. For example, communication links between the input source 102 and the server 104 may include wired connections, such as a serial or parallel bus, or wireless links, such as short-range wireless, IEEE 802.11 (IEEE 802.11 may refer to IEEE 802.11-2007, IEEE 802.11n-2009, or any other IEEE 802.11 revision), or other wireless based communication links.

The input source 102 may be any source from which a 3D object data model may be received. In some examples, 3D object data model acquisition (shape and appearance) may be achieved by working with venders or manufacturers to scan objects in 3D. For instance, structured light scanners may capture images of an object and a shape of the object may be recovered using monochrome stereo cameras and a pattern projector. In other examples, a high-resolution SLR camera may be used to capture images for color texture information. In still other examples, a raw computer-aided drafting (CAD) set of drawings may be received for each object. Thus, the input source 102 may provide a 3D object data model, in various forms, to the server 104. As one example, multiple scans of an object may be processed into a merged mesh and assets data model, and provided to the server 104 in that form.

The server 104 includes a model builder 110, an object data model processor 112, a semantics and search index 114, and a graphics library 116, a shader application 118, a materials application 120, and an object data model renderer/viewer 122. Any of the components of the server 104 may be coupled to each other. In addition, any components of the server 104 may alternatively be a separate component coupled to the server 104. The server 104 may further include a processor and memory including instructions executable by the processor to perform functions of the components of the server 104, for example, and may take the form of a computing device.

The model builder 110 receives the mesh data set for each object from the input source 102, which may include a data set defining a dense surface mesh geometry, and may generate an animated model of the object in 3D. For example, the model builder 110 may perform coherent texture unwrapping from the mesh surface, and determine textures of surfaces emulated from the geometry.

The object data model processor 112 may also receive the mesh data set for each object from the input source 102 and generate display meshes. For instance, the scanned mesh images may be decimated (e.g., from 5 million to 120,000 surfaces) utilizing texture-preserving decimation. Texture map generation can also be performed to determine color texture for map rendering. Texture map generation may include using the mesh data sets H that have colors but no UV (coordinate system of a 2D texture space) unwrapping to generate a mesh D with UV unwrapping but no colors. As an example, for a single output texture pixel of an image processing may include, for a given point in UV determine a triangle in the mesh's UV mapping D, and using triangle-local coordinates, move to an associated 3D point on the mesh. A bidirectional ray may be cast along the triangle's normal to intersect with the mesh H, and color, normal and displacement may be used for an output. To generate an entire texture image, each pixel in the image can be processed.

In some examples, the model builder 110 or the object data model processor 112 may output a 3D object data model of an object that includes one file with a combination of all data needed to render a 3D image of the object. In other examples, the model builder 110 or the object data model processor 112 may output a 3D object data model in the form of multiple files so that the 3D object data model file is divided into smaller parts.

The semantics and search index 114 may receive captured images or processed images that have been decimated and compressed, and may perform texture resampling and also shape-based indexing. For example, for each object, the semantics and search index 114 may index or label components of the images (e.g., per pixel) as having a certain texture, color, shape, geometry, attribute, etc. The semantics and search index 114 may receive the 3D object data model file or the files comprising the 3D object data model from the model builder 110 or the object data model processor 112, and may be configured to label portions of the file or each file individually with identifiers related to attributes of the file.

In some examples, the semantics and search index 114 may be configured to provide annotations for aspects of the 3D object data models. For instance, an annotation may be provided to label or index aspects of color, texture, shape, appearance, description, function, etc., of an aspect of a 3D object data model. Annotations may be used to label any aspect of an image or 3D object data model, or to provide any type of information. Annotations may be performed manually or automatically. In examples herein, an annotated template of an object in a given classification or category may be generated that includes annotations, and the template may be applied to all objects in the given classification or category to apply the annotations to all objects.

The graphics library 116 may include a WebGL or OpenGL mesh compression to reduce a mesh file size, for example. The graphics library 116 may provide the 3D object data model in a form for display on a browser, for example. In some examples, a 3D object data model viewer may be used to display images of the 3D objects data models. The 3D object data model viewer may be implemented using WebGL within a web browser, or OpenGL, for example.

The shader application 118 may be configured to apply a shader to portions of the 3D object data model file or to files of the 3D object data model according to the indexes of the file (as labeled by the semantics and search index 114) to generate a 3D image. The shader application 118 may be executed to apply a shader from a number of shaders according to the indexes of the file. The shader may include information related to texture, color, appearance, etc., of a portion of the 3D image.

In one example, the shader application 118 may be executed to render an image with shading attributes as defined by indexes of the files. For example, objects with multiple surfaces may have different attributes for each surface, and the shader application 118 may be executed to render each surface accordingly.

The materials application 120 may be configured to apply a material to portions of the 3D object data model file or to files of the 3D object data model according to the indexes of the file (as labeled by the semantics and search index 114) to generate a 3D image. The materials application 120 may be executed to apply a material from a number of materials according to the indexes of the file. The materials application may apply any material, such as leather, metal, wood, etc., so as to render an appearance of a portion of the 3D image.

In one example, the materials application 120 may access a database that includes information regarding a number of reference materials (e.g., brass, fur, leather), and objects with multiple materials may be separated into distinct portions so that the materials application 120 can be executed to render the separate distinct portions. As an example, a hood on a car may include a hood ornament, and the hood may be painted and the ornament may be chrome. The materials application 120 and the shader application 118 can be executed to identify two separate materials and render each material with an appropriate shade.

The object data model renderer/viewer 122 may receive the 3D object data model file or files and execute the shader application 118 and the materials application 120 to render a 3D image.

The database 106 may store all data sets for a 3D object data model in any number of various forms from raw data captured to processed data for display.

The output target 108 may include a number of different targets, such as a webpage on the Internet, a search engine, a database, a computing device, etc. The output target 108 may include a 3D object data model viewer that enables product advertisements or product searches based on the 3D object data model.

In examples herein, the system 100 may be used to acquire data of an object, process the data to generate a 3D object data model, and render the 3D object data model for display.

Figure 2:
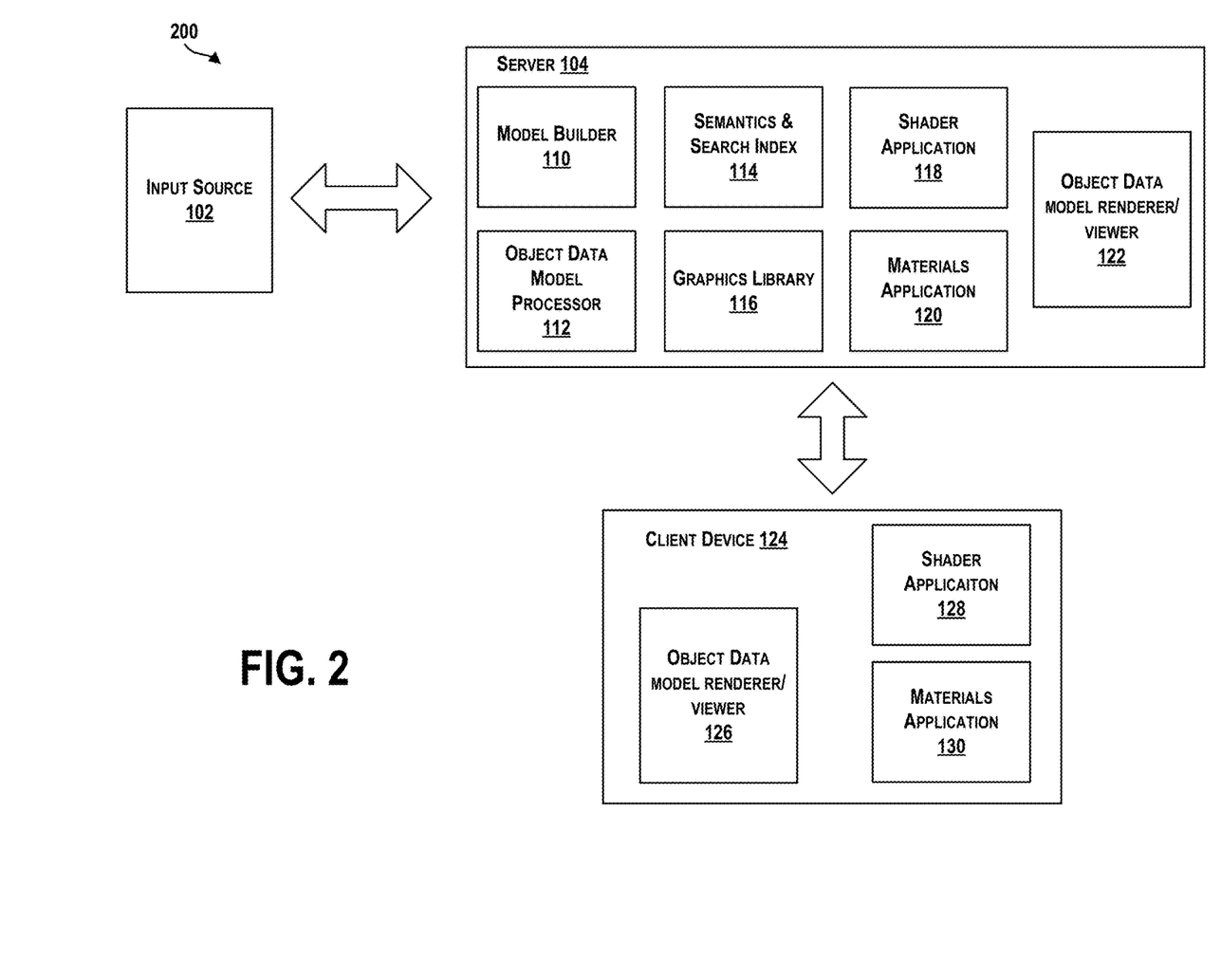
FIG. 2 illustrates another example system for object data modeling, in accordance with one example.

FIG. 2 illustrates another example system 200 for object data modeling, in accordance with one example. The system 200 includes the input source 102 coupled to the server 104, which is coupled to a client device 124. The input source 102 and the server 104 may be as described in FIG. 1. The client device 124 may receive outputs from any of the components of the server 124, and may be configured to render a 3D image.

The client device 124 includes an object data model renderer/viewer 126, a shader application 128, and a materials application 130. The object data model renderer/viewer 126, the shader application 128, and the materials application 130 may all be configured as described with respect to the object data model renderer/viewer 122, the materials application 120, and the shader application 118 of the server 104 as described with respect to FIG. 1.

In some examples, the client device 124 may receive the 3D object data model file or files from the server 104 and render a 3D image of the object by executing the shader application 128 and the materials application 130. When executing the shader application 128 and the materials application 130, the client device 124 may access separate databases to retrieve appropriate shader and material information to apply to the image, access the server 104 to receive appropriate shader and material information from the shader application 118 and the materials application 120, or may store information locally regarding the appropriate shader and material information to apply.

In some examples, the client device 124 may receive the 3D object data model file or files from the server 104 and render a 3D image of the object. In other examples, the server 104 may render a 3D image of the object and stream the 3D image to the client device 124 for display.

As described, in some examples, the 3D object data model may include various forms of data, such as raw image data captured, mesh data, processed data, etc. Data of the 3D object data model may be encoded and compressed so as to store information related to 3D geometry of an object associated with information related to appearance of the object for transmission and display within a web browser or application on a device.

In one example, data of the 3D object data model may be compressed by initially encoding a triangle mesh representing the 3D object as a list including a plurality of vertices and a plurality of indices. Each vertex in the list may have several arbitrary parameters associated with the vertex, including, but not limited to, position, surface normal, and texture coordinates. The triangle indices may be stored in a 16-bit unsigned integer format and vertex attributes may be stored in a 32-bit floating point format. The 32-bit floating point format vertex attributes may be reduced to 15-bits. In instances in which compressed data is for a version of a web browser or application that does not have the ability to decompress dictionary encoded data, a delta compression may be used to store differences between the triangle indices and vertex attributes, either in an array of structures layout or a transposed layout. After delta compression, post-delta data may be ZigZag encoded (e.g., using open-source Protocol Buffer library available from Google Inc.). Encoding may follow the format ZigZag(x): (x<<1) ^(x>>15) with a corresponding decoding (during decompression) to follow the format UnZigZag(x): (x>>1) ^(-x & 1)). ZigZag encoding may be followed by multi-byte character encoding using UTF-8 encoding. Finally, the UTF-8 encoded data may be compressed using GNU Gzip or bzip2 to generate a compressed 3D object data model file.

The compressed copy of the 3D object data model file may be stored in a database, such as the database 106 in FIG. 1, in the server 104, or on the client device 124, for example. In some examples, the compressed 3D object data model file may be provided by the server 104 to the client device 124 in response to a request from the client device 124. If using a web browser to view the 3D object data model file, the client device 124 may decompress the compressed 3D object data model file according to Java instructions provided in the object browser web page. A local copy of the object browser web page and a local copy of the uncompressed, searchable data of the 3D object data model file can be stored in local memory of the client device 124. The client device 124 may display exemplary screenshots of an initial default view of a 3D object, based on the searchable data of the 3D object data model file loaded in the web browser.

In some examples, the 3D object data file includes information as to geometry of an object sorted by material and divided into portions to be loaded as fragments and reassembled in portions by the client device. As one example, for a mobile phone comprising multiple parts, each part may be rendered using a separate or distinct shader for each material. Thus, the 3D object data file may be divided into multiple portions and compressed as described above to retain all portions. The client device may receive the compressed 3D object data file, decompress the file, and reassemble the portions of the object one-by-one by loading each fragment of the file, streaming file requests for each shader, and reassembling an image of the object.

As described above, the systems 100 or 200 may be used to acquire data (e.g., images) of an object, process the data to generate a 3D object data model, and render the 3D object data model for display. The systems 100 and 200 are illustrated as block diagrams in FIGS. 1 and 2.

Figure 3A:
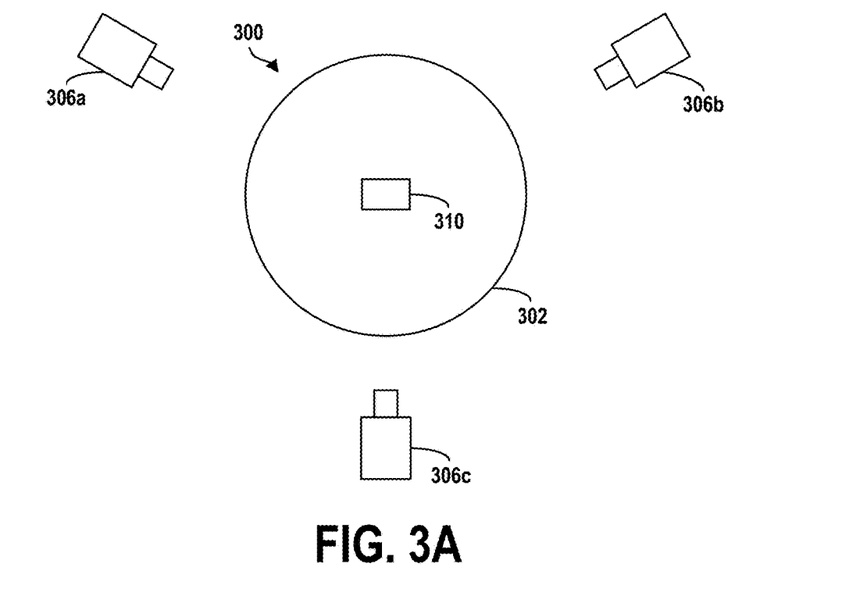
FIG. 3A illustrates a top view of an example system for image acquisition, in accordance with an embodiment.
Figure 3B:
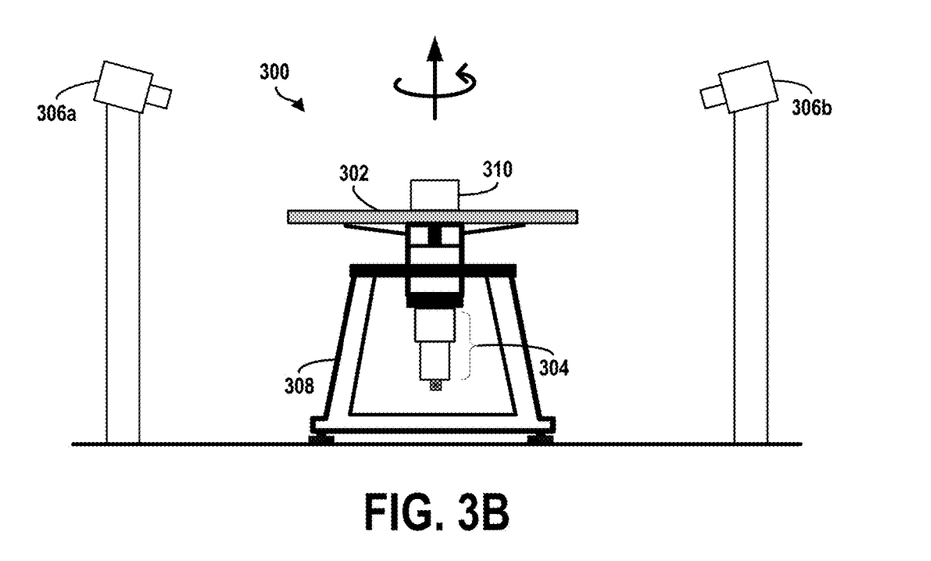
FIG. 3B illustrates a front view of the example system for image acquisition, in accordance with an embodiment.

FIG. 3A illustrates a top view of an example system 300 for image acquisition, in accordance with an embodiment and FIG. 3B illustrates a front view of the example system for image acquisition, in accordance with an embodiment.

The system 300 in FIGS. 3A-3B may include a rotatable surface 302 that a computing device may be configured to cause to incrementally rotate to multiple angles using a drive system 304. The rotatable surface 302 is shown as a circular surface for illustration only. Other shapes are possible. The drive system 304 may, for example, include one or more motors and motor drive systems configured to receive commands from the computing device and control rotation of the one or more motors. In some examples, the rotating surface 302 may be configured to be rotated manually. Other drive systems are possible.

The system 300 may include scanners 306A-C positioned around the rotatable surface 302. Three projectors 306A-C are shown for illustration only. More or less scanners may be used. In the example system 300, the scanners 306A-C are positioned around the rotatable surface 302 such that the computing device is configured to cause the rotatable surface 302 to rotate using the drive system 304. The scanners 306A-C may include projectors and cameras.

The system 300 may include a support 308, as shown in FIG. 3B, that is configured to support the rotatable surface 302, and the drive system 304. Configuration of the support 308 shown in FIG. 3B is for illustration only. Other support configurations are possible.

The system 300 may be configured to acquire images of an object 310 that is placed on the rotatable surface 302. The object 310 can be any object (e.g., a bag, a shoe, a phone, etc.). The computing device may be configured to cause the rotatable surface 302 to rotate to eight discrete angles (e.g., 45°, 90°, 135°, 180°, 225°, 270°, 315°, and 360°) from a given starting point. In one example, the rotatable surface 302 may comprise a transparent material and the scanners 306A-C may be configured to capture images of the object from a given elevation (e.g., below the rotatable surface 302) that allows capturing images of a bottom view of the object 310 through the transparent rotatable surface 302.

In an example, each of the scanners 306A-C may include a respective light source. In this example, the computing device may be configured to control the light source to project a pattern on the object 310, where the pattern is made of light emitted from the light source. The pattern may be simple (e.g., dots tracing a curve), or complex (e.g., a flower).

The light source may generally include any type of an electromagnetic radiation source. Light source and electromagnetic radiation source are used interchangeably herein. The electromagnetic radiation source may be configured to project light of any wavelength, visible or invisible. For example, the electromagnetic radiation source may be configured to project visible light such as laser beams with different colors and may additionally or alternately be configured to project invisible light such as infrared light. The computing device may be configured to switch on or activate the scanners 306A-C to project the pattern on the object 312, and may be configured to switch off or deactivate the projectors 306A-C to remove the pattern. Multiple patterns can be projected on the object 310. In examples, patterns may be projected on substantially all parts (e.g., sides, edges, etc.) of the object 310 and may include multiple colors.

One or more of the scanners 306A-C may be configured to capture, and capable of capturing, while the pattern is projected on the object 310, images that depict the pattern projected by the projectors of the scanners 306A-C on the object 310. For example, if the projectors include electromagnetic radiation sources that project invisible infrared light patterns on the object, the cameras may be configured images while the infrared light pattern is projected on the object 310.

In one example, the scanners 306A-C include multiple cameras mounted adjacent each other. The multiple cameras may include a high-resolution SLR camera configured to capture color images of the object 310, and a depth camera configured to capture depth information of the object 310. The multiple cameras may be mounted in the same enclosure or adjacent each other to capture images and information about the object 310 from the same or substantially same viewpoint.

The rotatable surface 302 may be rotated a number of times to rotate through a number of angles. As an example for illustration, the computing device may be configured to cause the rotatable surface 302 to incrementally rotate to eight discrete angles and repeat capturing respective images of the object 310 using the scanners 306A-C. A number of angles of the multiple angles of rotation may vary based on complexity of the object 310, for example. Images from fewer angles may be captured for a symmetric object, for example, than for a more complex object that is not symmetric. In addition, various lighting or backgrounds may be applied to the object 310, and images may be captured depicting the variations.

In some examples, upon capturing images of the object 310 from the multiple angles of rotation, a given computing device may be configured to match portions of the pattern in each image of the images to corresponding portions of the pattern in subsequent images that are spatially neighboring, based on respective capture angles/locations, so as to spatially align the images. The system 300 may be configured to acquire the images and process the data to generate a 3D object data model of the object 310.

The images may include the object 310 in a background. It may be desirable to remove the background to produce an image of the object 310 by itself. Within examples, methods are described for determining a robust segmentation of foreground and background image pixels representative of the object and the background. Examples may include segmenting photos of people, animals, or other objects for a broad class of computational photography domains, including green-screen for special effects, and a broad class of image compositing applications.

As one example, product images generally need to have uniform background image pixels to make the product images appear consistent when presented as a collection. One method may be performed to compute a segmentation of pixels that separates object pixels from background pixels by performing background subtraction, which computes a difference between an image taken with an object and an empty image taken without the object to filter out background pixels. Background subtraction, however, may require a clean object image mask, which may be difficult to determine if there are pixel colors present on the object that are also similar or equivalent to the background pixel colors.

Within examples herein, methods are provided for utilizing a depth camera to acquire robust object foreground masks for image processing. Depth information about an object may be projected into a high-resolution image taken by a separate camera, and object segmentation may be performed using the coarse mask as a prior. The methods provide a way to segment into three image pixel sets including the object itself, the background, and optional shadow pixels generated for an object that may be resting on a surface that extends from the background to the foreground and are a function of the lighting, for example. Thus, an image of an object may be captured, and the object may be isolated by removing the background using the robust object foreground masks.

Figure 4:
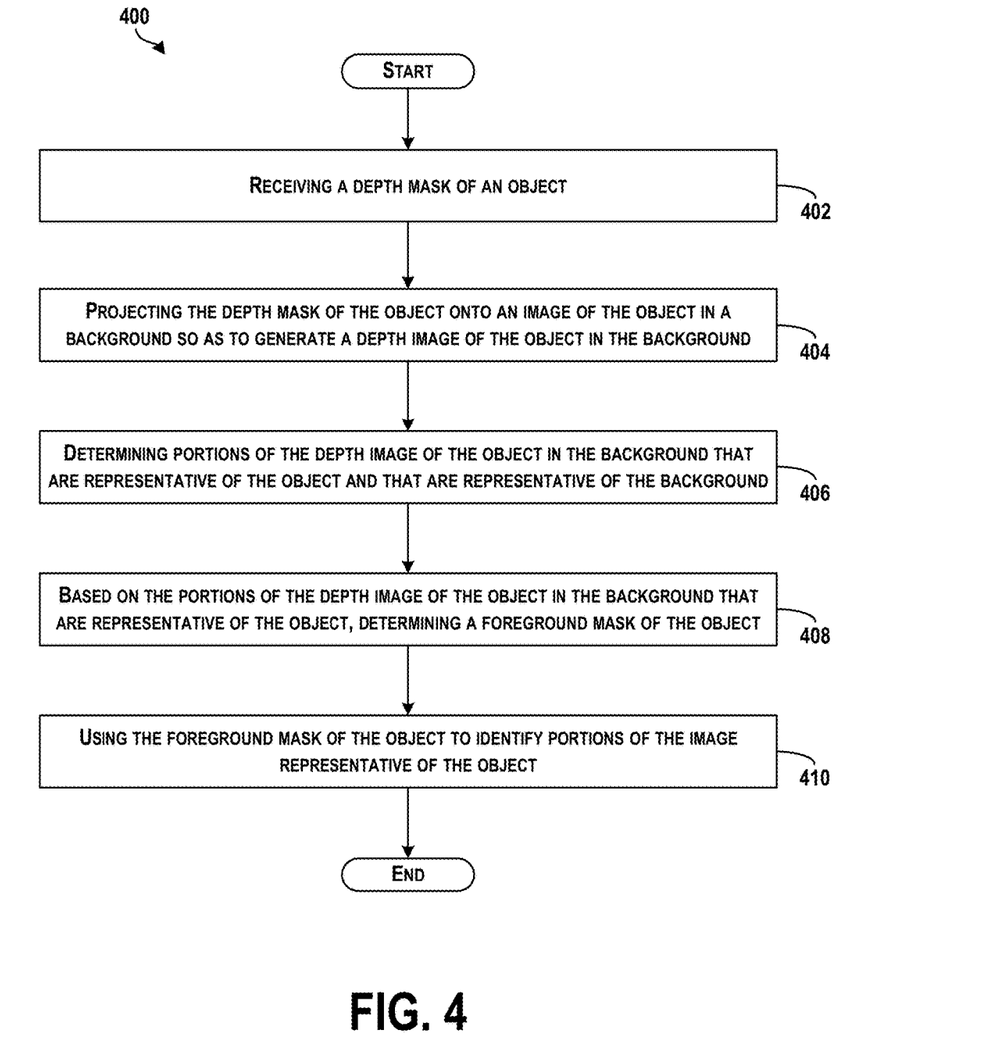
FIG. 4 illustrates a flowchart of an example method object image masking, in accordance with an embodiment.

FIG. 4 illustrates a flowchart of an example method 400 object image masking, in accordance with an embodiment. The method 400 shown in FIG. 4 presents an embodiment of a method that could be used by the systems 100 or 200 of FIGS. 1-2, for example, or the system 300 in FIGS. 3A-3B. The method 400 may include one or more operations, functions, or actions as illustrated by one or more of blocks 402-410. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the flowchart shows functionality and operation of one possible implementation of present examples. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium or memory, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. The computer readable medium may be tangible and may differ from a wireless or transitory communication medium.

In addition, for the method 400 and other processes and methods disclosed herein, each block in FIG. 4 may represent circuitry that is wired to perform the specific logical functions in the process.

At block 402, the method 400 includes receiving a depth mask of an object. The depth mask may indicate three-dimensional (3D) aspects of the object. A projector may be or include a structured light projector that has a laser with a pattern generator to produce a dot pattern on the object. The projector may be configured to operate in conjunction with a camera to recover information regarding depth of the object, such as three-dimensional (3D) characteristics of the object. For example, the camera may be configured to capture video data of the dot pattern in 3D under ambient light conditions to sense a range of the object in the environment. The projector and/or camera may be configured to determine shapes of the object based on the projected dot pattern. By way of example, the projector may produce a dot pattern on the object and cause the camera to capture an image of the dot pattern on the object, and the image of the dot pattern can be processed, using various algorithms to triangulate and extract 3D data, and output a depth mask of the object.

In other examples, the depth mask of the object may be received from a database of stored 3D object data models. For example, an image of the object in the background may be received, and a database of 3D object data models may be searched for a 3D model that matches the image of the object in the background. In this manner, prior accumulated depth masks may be used that correspond to objects in the image. The 3D object data model may not be required to be a model of the exact object in the image, but rather a model that matches to a shape of the object. For instance, the object may be a shoe, and any 3D object data model that matches to the shoe may be used (e.g., both gym shoes of same/similar shapes), rather than requiring an exact match of color, manufacturer, etc. of the shoe.

In still other examples, the depth mask of the object may be generated based on images of the object from an SLR camera. For example, a non-rigid alignment of the object in the images can be performed with 3D models in the 3D object model database to generate the depth mask by using feature matching.

At block 404, the method 400 includes projecting the depth mask of the object onto an image of the object in a background so as to generate a depth image of the object in the background. For example, the depth camera may capture the images of the object from a viewpoint, as shown in examples in FIGS. 3A-3B. A second camera, such as an SLR camera or RGB camera configured to capture high-resolution images, may be configured to capture an image of the object in the background from the same viewpoint. The second camera may be mounted adjacent the projector and camera (e.g., depth camera) that capture the depth mask information. In this manner, a first camera may capture the depth mask of the object, a second camera may capture the image of the object in the background, and a relative positioning of the first camera to the second camera can be determined. Since the two cameras are position adjacent, the depth mask of the object can be projected onto the image of the object in the background based on the relative positioning of the cameras so as to generate the depth image of the object in the background. In some examples, depth masks of the object can be overlaid with images of the object in the background that were captured at the same time (e.g., using timestamps).

In one example, the depth camera may acquire a single view of the object from the viewpoint of the RGB camera. In another example, the depth camera may be configured to acquire multiple views, and all depth measurements can be merged into a single 3D volumetric representation that is used to determine depth masks from any vantage point.

Thus, the depth mask can be reprojected into a high-resolution image taken by a separate (potentially non-depth) camera image. The resulting depth image can be used as a coarse prior for computing a detailed object segmentation.

At block 406, the method 400 includes determining portions of the depth image of the object in the background that are representative of the object and that are representative of the background. In one example, a first portion of the depth image of the object in the background can be assigned as the background, a second portion of the depth image of the object in the background can be assigned as the object, and a third portion of the depth image of the object in the background can be assigned as shadow of the object. To make assignments, edge estimation of the object can be performed to create a boundary outline of the object based on the edge estimation.

Within examples, the depth image is processed using alpha-matting to generate a tri-map of portions of the depth image that are definitely object, might be the object, and are definitely background. As an example, alpha matting may be used to mix a color of each pixel with a predefined background color in a proportion defined by an alpha (opacity) channel. The more transparent the pixel, the higher an amount of the background color. If the pixel is 0% opaque (100% transparent), its color becomes identical to the background color, and segmentation can be defined in this way. Based on such assignments, iterations can be performed to develop improved approximations of boundaries of the object in the image, for example.

In other examples, the depth image of the object may be segmented using loopy belief propagation or expectation maximization (EM) algorithms.

Within examples, the segmentation computation is robust to objects that contain image pixel colors that are similar (or equal) to the background image pixels. Object masks can be determined that distinguish between actual topological "holes" through an object as opposed to color features on the object that appear as holes.

At block 408, the method 400 includes based on the portions of the depth image of the object in the background that are representative of the object, determining a foreground mask of the object. For example, a mask of the object within the depth image can be determined after segmentation of the object and background.

At block 410, the method 400 includes using the foreground mask of the object to identify portions of the image representative of the object. For example, portions of the image representative of the background can be removed to output an image of the object with the background removed.

In other examples, other outputs are possible too including assignments of background, the object, and the object with a shadow outline (e.g., a percentage shadow and percentage background). The shadow outline may include shadow pixels generated for an object that may be resting on a surface that extends from the background to the foreground, and may be a function of the lighting. In some examples, the foreground mask of the object can be modified to include the shadow outline.

Figure 5A:
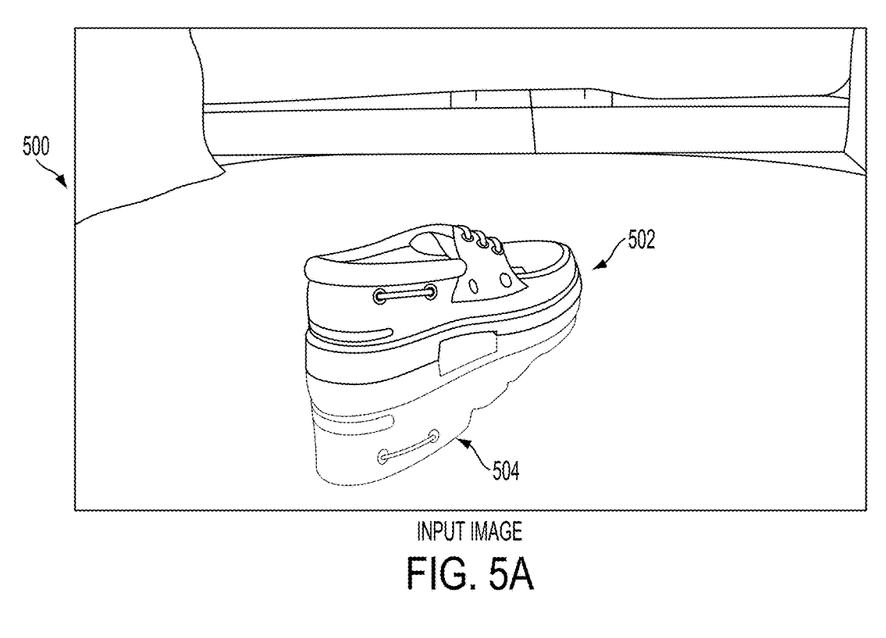
FIG. 5A illustrates an example input image of an object in a background.

FIG. 5A illustrates an example input image 500 of an object in a background. In FIG. 5A, the image 500 includes a shoe 502 resting on a table, and has other elements in a background portion as well. The shoe 502 may be considered in a foreground of the image. The image 500 may be captured by an RGB camera, and based on a surface of the table, a reflection 504 of the shoe is captured in the image.

Figure 5B:
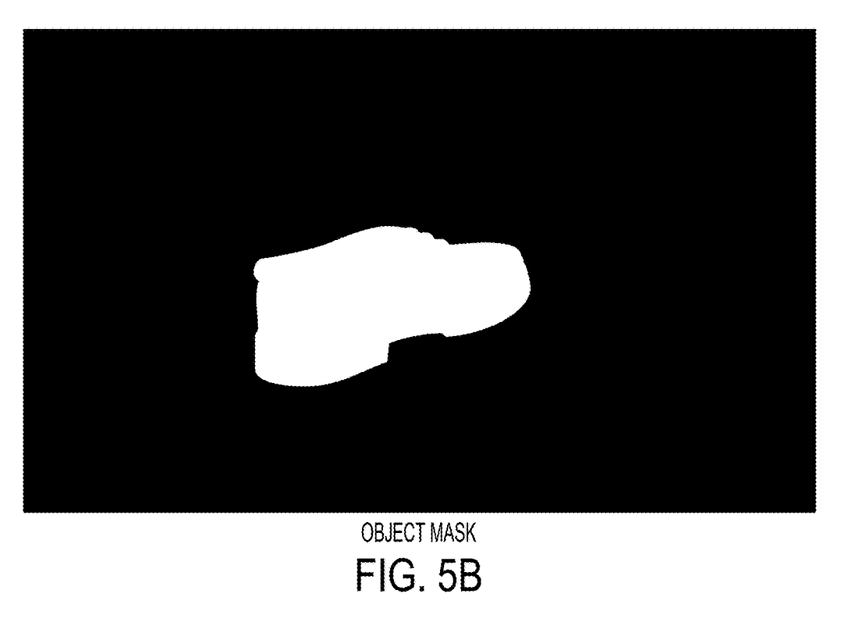
FIG. 5B illustrates an example object depth mask.

FIG. 5B illustrates an example object depth mask. The object depth mask shows an outline of the object (e.g., shoe) and a remainder of the image 500 from FIG. 5A is removed. The object depth mask may be captured by a system including a structured light projector and a camera to recover information regarding depth of the object, such as three-dimensional (3D) characteristics of the object.

Figure 5C:
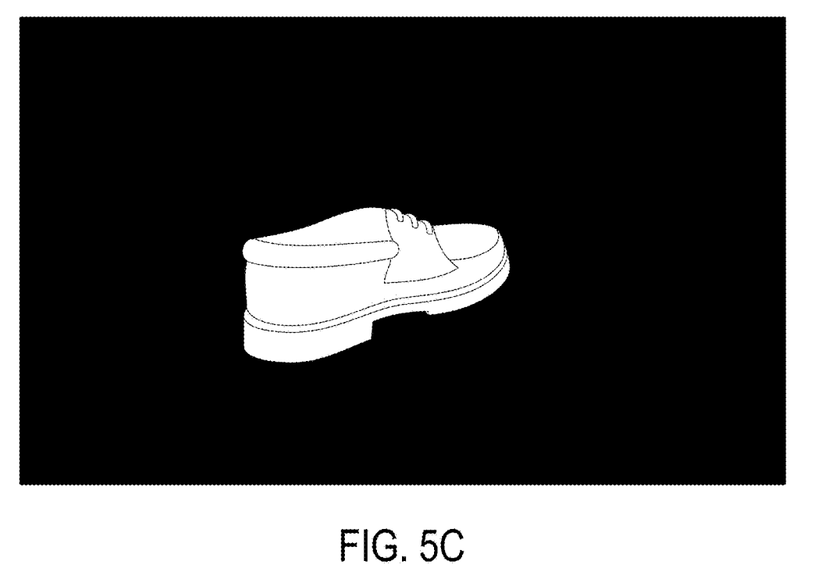
FIG. 5C illustrates an example depth image of the object.

FIG. 5C illustrates an example depth image of the object. The depth image may be generated by projecting the object depth mask shown in FIG. 5B onto the image 500 shown in FIG. 5A. Based on the projection, the depth image may map to the object of the image in FIG. 5A in the foreground so as to determine a foreground mask.

Figure 5D:
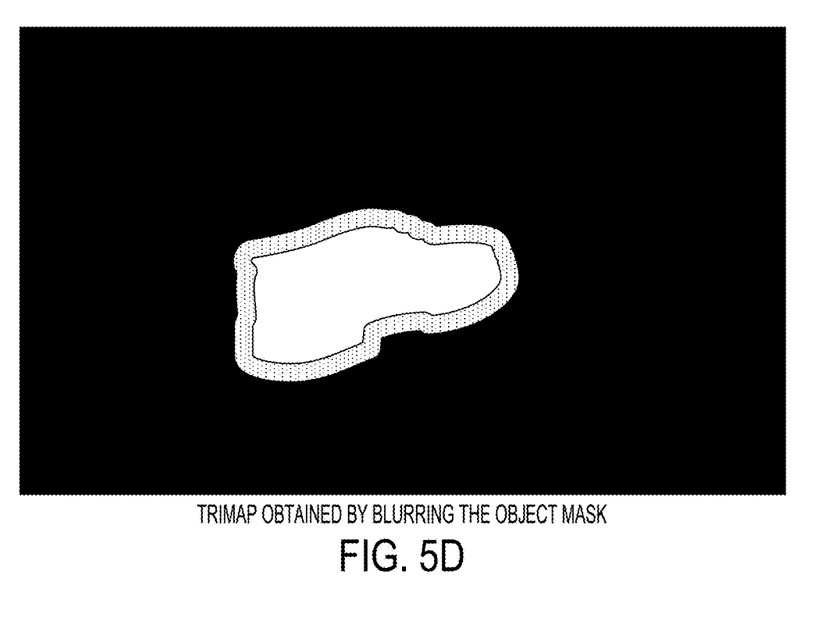
FIG. 5D illustrates an example trimap mask of the object.

FIG. 5D illustrates an example trimap mask of the object. The trimap may be obtained by blurring edges of the object mask, for example.

In other examples, when multiple images are captured of the object with different lighting scenarios, the images can be leveraged to improve overall object segmentation and subsequent mask generation. The images of the objects in the multiple lighting scenarios can be used to distinguish instances where object and background colors are similar by independently lighting the background and the object (foreground) and performing multiple background subtraction steps, for example.

Figure 6:
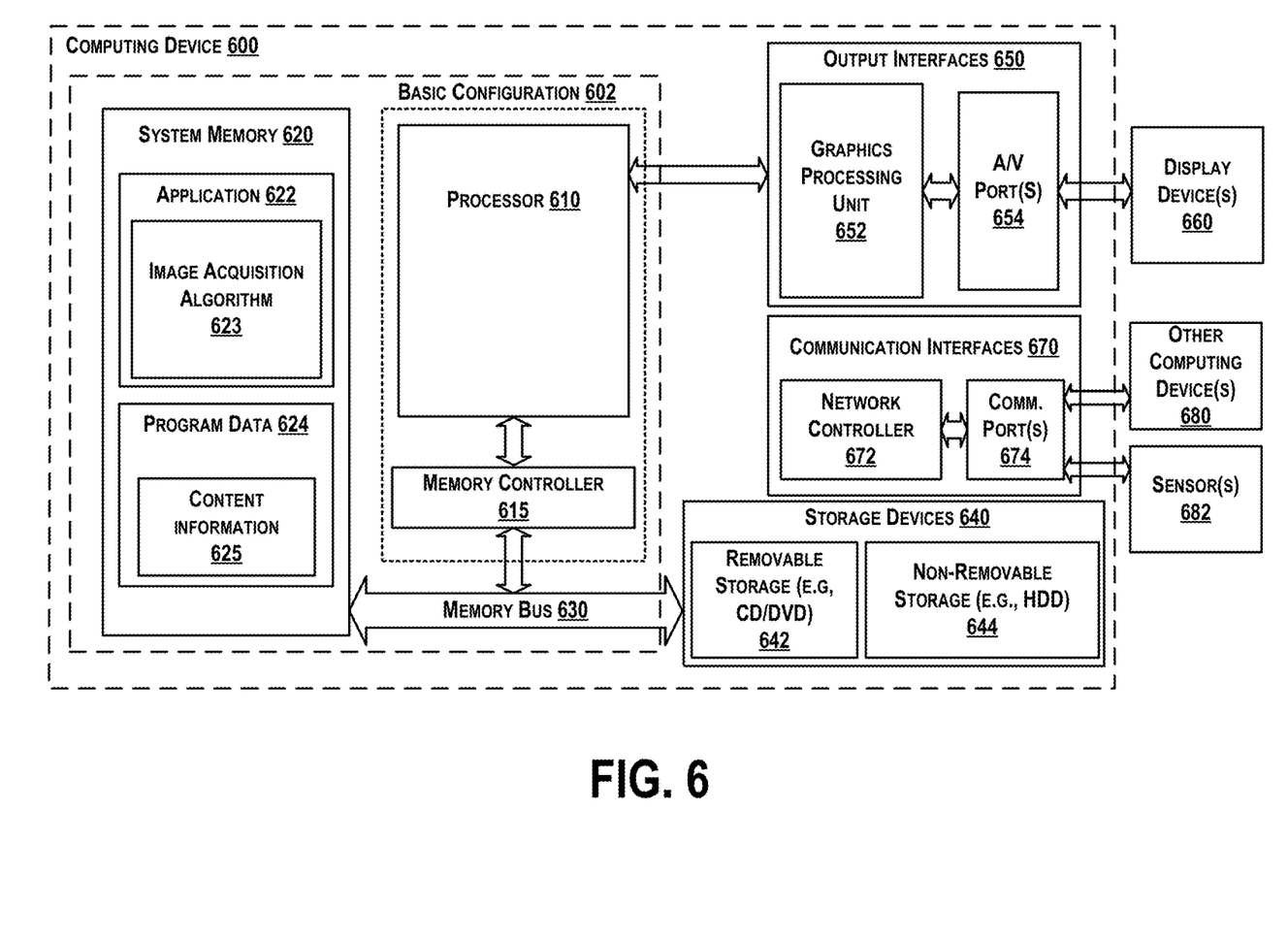
FIG. 6 is a functional block diagram illustrating an example computing device used in a computing system that is arranged in accordance with at least some embodiments described herein.

FIG. 6 is a functional block diagram illustrating an example computing device used in a computing system that is arranged in accordance with at least some embodiments described herein. The computing device may be a personal computer, mobile device, cellular phone, touch-sensitive wristwatch, tablet computer, etc., and may be implemented to provide a system (or components thereof) as described in FIGS. 1-3. The computing device 600 may, for example, be used to implement the method 400 illustrated in FIG. 4.

In a basic configuration 602, computing device 600 may include one or more processors 610 and system memory 620. A memory bus 630 can be used for communicating between the processor 610 and the system memory 620. Depending on the desired configuration, processor 610 can be of any type including but not limited to a microprocessor (μP), a microcontroller (μC), a digital signal processor (DSP), or any combination thereof. A memory controller 615 can also be used with the processor 610, or in some implementations, the memory controller 615 can be an internal part of the processor 610.

Depending on the desired configuration, the system memory 620 can be of any type including but not limited to volatile memory (such as RAM), non-volatile memory (such as ROM, flash memory, etc.) or any combination thereof. System memory 620 may include one or more applications 622, and program data 624. Application 622 may include image acquisition algorithm 623. Program data 624 may include content information 625 that could be directed to any number of types of data. In some example embodiments, application 622 can be arranged to operate with program data 624 on an operating system.

Computing device 600 can have additional features or functionality, and additional interfaces to facilitate communications between the basic configuration 602 and any devices and interfaces. For example, data storage devices 640 can be provided including removable storage devices 642, non-removable storage devices 644, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 620 and storage devices 640 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 600. Any such computer storage media can be part of the computing device 600.

The computing device 600 can also include output interfaces 650 that may include a graphics processing unit 652, which can be configured to communicate to various external devices such as display devices 660 or speakers via one or more A/V ports 654 or a communication interface 670. The communication interface 670 may include a network controller 672, which can be arranged to facilitate communications with one or more other computing devices 680 and one or more sensors 682 over a network communication via one or more communication ports 674. The one or more sensors 682 are shown external to the computing device 600, but may also be internal to the device.

Figure 7:
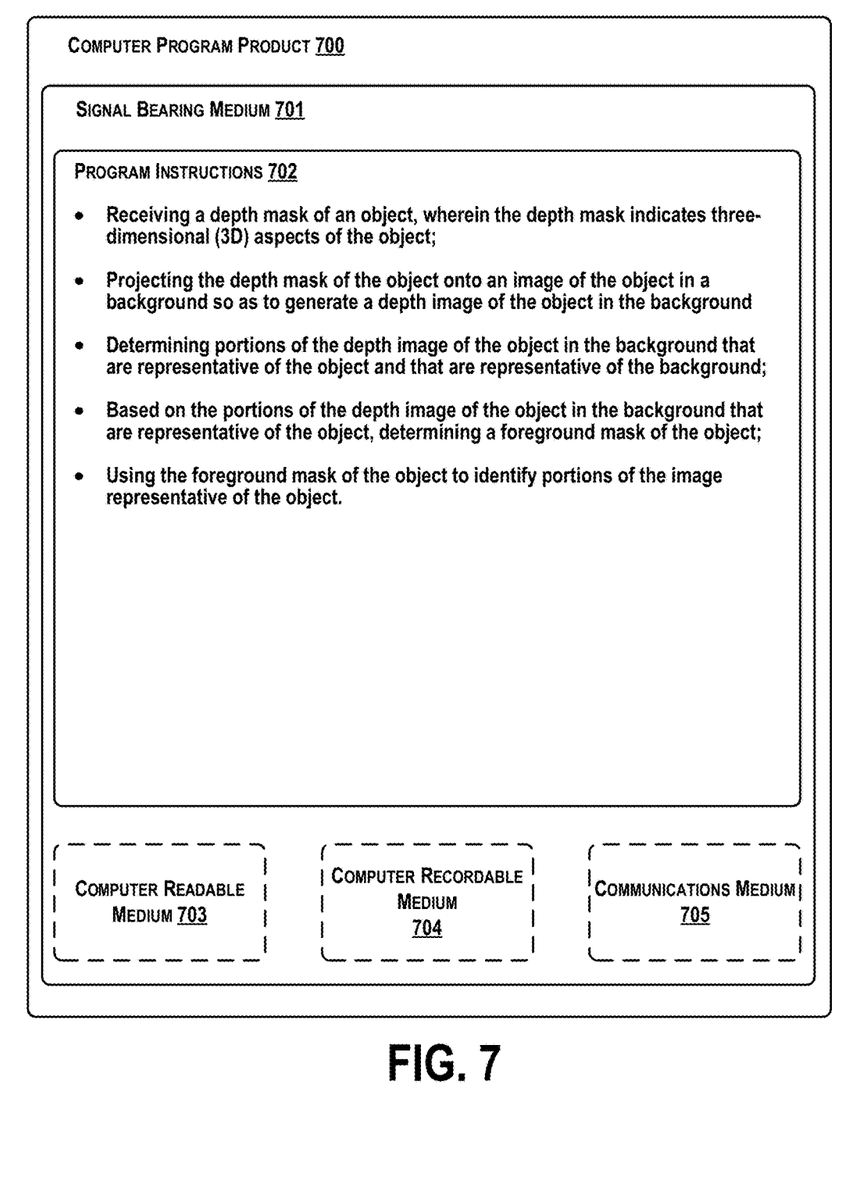
FIG. 7 is a schematic illustrating a conceptual partial view of an example computer program product that includes a computer program for executing a computer process on a computing device, arranged according to at least some embodiments presented herein.

In some embodiments, the disclosed methods may be implemented as computer program instructions encoded on a non-transitory computer-readable storage media in a machine-readable format, or on other non-transitory media or articles of manufacture. FIG. 7 is a schematic illustrating a conceptual partial view of an example computer program product that includes a computer program for executing a computer process on a computing device, arranged according to at least some embodiments presented herein.

In one embodiment, the example computer program product 700 is provided using a signal bearing medium 701. The signal bearing medium 701 may include one or more programming instructions 702 that, when executed by one or more processors may provide functionality or portions of the functionality described above with respect to FIGS. 1-6. In some examples, the signal bearing medium 701 may encompass a computer-readable medium 703, such as, but not limited to, a hard disk drive, a Compact Disc (CD), a Digital Video Disk (DVD), a digital tape, memory, etc. In some implementations, the signal bearing medium 701 may encompass a computer recordable medium 704, such as, but not limited to, memory, read/write (R/W) CDs, R/W DVDs, etc. In some implementations, the signal bearing medium 701 may encompass a communications medium 705, such as, but not limited to, a digital and/or an analog communication medium (e.g., a fiber optic cable, a waveguide, a wired communications link, a wireless communication link, etc.). Thus, for example, the signal bearing medium 701 may be conveyed by a wireless form of the communications medium 705 (e.g., a wireless communications medium conforming to the IEEE 802.11 standard or other transmission protocol).

The one or more programming instructions 702 may be, for example, computer executable and/or logic implemented instructions. In some examples, a computing device such as the computing device 600 of FIG. 6 may be configured to provide various operations, functions, or actions in response to the programming instructions 702 conveyed to the computing device 600 by one or more of the computer readable medium 703, the computer recordable medium 704, and/or the communications medium 705.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   receiving a depth mask of an object, wherein the depth mask indicates three-dimensional (3D) aspects of the object;
   projecting, by a computing device, the depth mask of the object onto an image of the object in a background so as to generate a depth image of the object in the background;
   determining portions of the depth image of the object in the background that are representative of the object and that are representative of the background;
   based on the portions of the depth image of the object in the background that are representative of the object, determining a foreground mask of the object;

determining a shadow outline of the object based on the foreground mask of the object;

modifying the foreground mask of the object to include the shadow outline; and using the modified foreground mask of the object to identify portions of the image representative of the object and representative of a shadow of the object.

2. The method of claim 1, wherein receiving the depth mask of the object comprises receiving the depth mask of the object from a first camera, and the method further comprises:

receiving the image of the object in the background from a second camera, wherein the first camera is mounted adjacent the second camera.

3. The method of claim 1, wherein determining portions of the depth image of the object in the background that are representative of the object and that are representative of the background comprises:

assigning a first portion of the depth image of the object in the background as the background;

assigning a second portion of the depth image of the object in the background as the object; and assigning a third portion of the depth image of the object in the background as shadow of the object, wherein the shadow of the object includes a portion of the background.

4. The method of claim 1, wherein using the foreground mask of the object to identify portions of the image representative of the object comprises:

removing portions of the image representative of the background; and outputting an image of the object with the background removed.

5. The method of claim 1, further comprising:

causing a first camera to capture the depth mask of the object;

causing a second camera to capture the image of the object in the background;

determining positioning of the first camera relative to the second camera; and based on the positioning, projecting the depth mask of the object onto the image of the object in the background so as to generate the depth image of the object in the background.

6. The method of claim 1, further comprising:

causing a first camera to capture the depth mask of the object from a viewpoint; and causing a second camera to capture the image of the object in the background from the same viewpoint.

7. The method of claim 1, further comprising:

receiving the image of the object in the background;

searching a database of three-dimensional (3D) object data models for a 3D model that matches the image of the object in the background; and wherein receiving the depth mask of the object comprises receiving the 3D model from the database that matches the image of the object in the background.

8. A non-transitory computer readable medium having stored therein instructions, that when executed by a computing device, cause the computing device to perform functions comprising:

receiving a depth mask of an object, wherein the depth mask indicates three-dimensional (3D) aspects of the object;

projecting the depth mask of the object onto an image of the object in a background so as to generate a depth image of the object in the background;

determining portions of the depth image of the object in the background that are representative of the object and that are representative of the background;

based on the portions of the depth image of the object in the background that are representative of the object, determining a foreground mask of the object; and determining a shadow outline of the object based on the foreground mask of the object;

modifying the foreground mask of the object to include the shadow outline; and using the modified foreground mask of the object to identify portions of the image representative of the object and representative of a shadow of the object.

9. The non-transitory computer readable medium of claim 8, wherein receiving the depth mask of the object comprises receiving the depth mask of the object from a first camera, and the functions further comprise:

receiving the image of the object in the background from a second camera, wherein the first camera is mounted adjacent the second camera.

10. The non-transitory computer readable medium of claim 8, wherein determining portions of the depth image of the object in the background that are representative of the object and that are representative of the background comprises:

assigning a first portion of the depth image of the object in the background as the background;

assigning a second portion of the depth image of the object in the background as the object; and assigning a third portion of the depth image of the object in the background as shadow of the object, wherein the shadow of the object includes a portion of the background.

11. The non-transitory computer readable medium of claim 10, wherein assigning the third portion of the depth image of the object in the background as shadow of the object comprises:

performing edge estimation of the object; and creating a boundary outline of the object based on the edge estimation.

12. The non-transitory computer readable medium of claim 8, wherein using the foreground mask of the object to identify portions of the image representative of the object comprises:

removing portions of the image representative of the background; and outputting an image of the object with the background removed.

13. A system comprising:

one or more processors; and data storage having stored therein instructions, that when executed by the one or more processors, cause the system to perform functions comprising:

receiving a depth mask of an object, wherein the depth mask indicates three-dimensional (3D) aspects of the object;

projecting the depth mask of the object onto an image of the object in a background so as to generate a depth image of the object in the background;

determining portions of the depth image of the object in the background that are representative of the object and that are representative of the background;

based on the portions of the depth image of the object in the background that are representative of the object, determining a foreground mask of the object; and determining a shadow outline of the object based on the foreground mask of the object;

modifying the foreground mask of the object to include the shadow outline; and using the modified foreground mask of the object to identify portions of the image representative of the object and representative of a shadow of the object.

14. The system of claim 13, wherein the function of receiving the depth mask of the object comprises receiving the depth mask of the object from a first camera, and the functions further comprise:

receiving the image of the object in the background from a second camera, wherein the first camera is mounted adjacent the second camera.

15. The system of claim 13, wherein the functions further comprise:

causing a first camera to capture the depth mask of the object;

causing a second camera to capture the image of the object in the background;

determining positioning of the first camera relative to the second camera; and based on the positioning, projecting the depth mask of the object onto the image of the object in the background so as to generate the depth image of the object in the background.

16. The system of claim 13, wherein the functions further comprise:

causing a first camera to capture the depth mask of the object from a viewpoint; and causing a second camera to capture the image of the object in the background from the same viewpoint.

17. The system of claim 13, wherein the functions further comprise:

receiving the image of the object in the background;

searching a database of three-dimensional (3D) object data models for a 3D model that matches the image of the object in the background, and wherein receiving the depth mask of the object comprises receiving the 3D model from the database that matches the image of the object in the background.

* * * * *